D. F. LOUDON.
PLANT STAND.
APPLICATION FILED OCT. 11, 1919.
1,336,307. Patented Apr. 6, 1920.
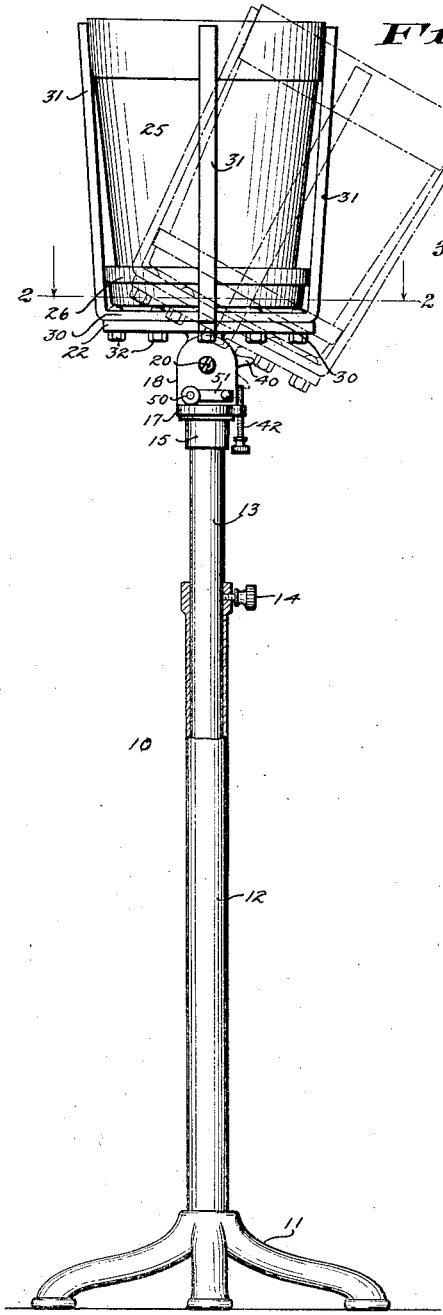
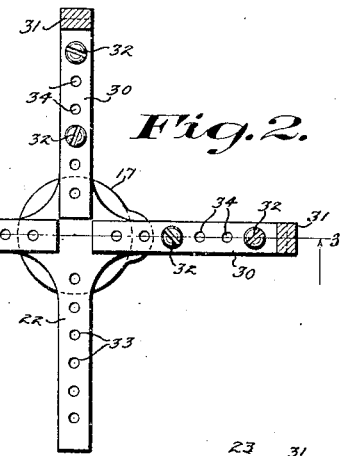
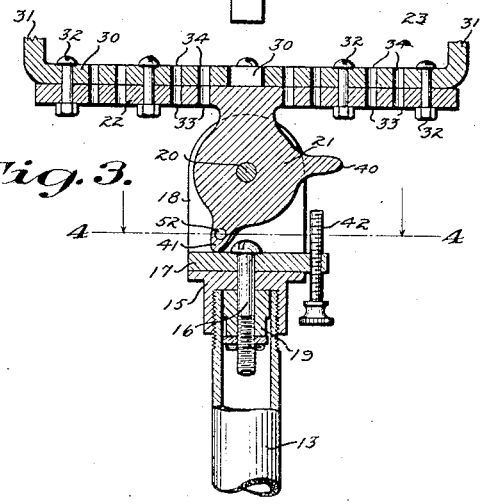
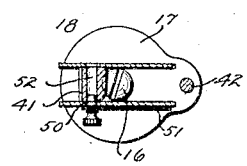
WITNESSES
INVENTOR
Dorr F. Loudon.
BY
ATTORNEYS

UNITED STATES PATENT OFFICE.

DORR F. LOUDON, OF NEW YORK, N. Y.

PLANT-STAND.

1,336,307.  Specification of Letters Patent.  Patented Apr. 6, 1920.

Application filed October 11, 1919. Serial No. 329,953.

*To all whom it may concern:*

Be it known that I, DORR F. LOUDON, a citizen of the United States, and a resident of the city of New York, borough of Manhattan, in the county and State of New York, have invented a new and Improved Plant-Stand, of which the following is a full, clear, and exact description.

The object of the invention is to provide a new and improved plant stand more especially designed for use in the home and arranged for holding potted plants in a proper angular position relative to the sunlight to insure uniform growth and development of the plant in every direction.

Another object is to enable the user to readily adjust the plant for accommodating pots of different sizes.

Another object is to permit of readily moving the pot holder into a vertical position and to allow of turning it around to display the plant to the best advantage.

Another object is to provide a plant stand for use in florists' show windows to display plants to the best advantage to passersby.

With these and other objects in view, the invention consists of certain novel features of construction as hereinafter shown and described and then specifically pointed out in the claims.

Figure 1 is a side elevation of the plant stand with part of the telescoping standard shown in section;

Fig. 2 is an enlarged sectional plan view of the pot holder, the section being on the line 2—2 of Fig. 1;

Fig. 3 is an enlarged sectional side elevation of the plant stand on the line 3—3 of Fig. 2; and Fig. 4 is a sectional plan view of the same on the line 4—4 of Fig. 3.

The standard 10 of the plant stand is preferably of the telescoping type and comprises a base 11 from which rises a tubular post 12 in which telescopes a tubular section 13 adapted to be fastened in the adjusted position by a set screw 14. The upper end of the tubular section 13 is provided with a cap 15 in which is held a pivot 16 engaging the base 17 on a head 18 mounted to turn on the said pivot 16. The pivot 16 is in the form of a bolt having a nut 19 screwing against the under side of the cap 15 and extending within the top of the tubular section 13, as plainly indicated in Fig. 3. The base 17 of the head 18 rests on the cap 15 and as the base is held in place by the pivot 16 it can readily turn on the cap but is held against accidental displacement.

The head 18 is provided with a transversely extending pivot 20 on which is mounted to swing a depending flange 21 of a spider-like base 22 of a pot holder 23 adapted to support a flower pot 25 containing a potted plant. On the base 22 of the pot holder 23 are adjustably mounted the horizontal bottom members 30 of arms 32 adapted to engage the sides of the pot 25 and its base 26. In order to permit adjustment of the arms 31 to accommodate pots of different sizes, use is made of bolts 32 engaging registering apertures 33, 34, of which the apertures 33 are formed in the arms of the spider-like base 22, and the apertures 34 are formed in the horizontal members 30 of the arms 31. The flange 21 is provided with two spaced lugs 40 and 41, of which the lug 40 is adapted to be seated on the upper end of a vertical screw 42 screwing in the base 17 of the head 18. By the use of the screw 42 the pot holder 23 is held in a desired angular position relative to the vertical axis of the stand so that the sunlight uniformly strikes the plant contained in the pot 25 with a view to insure uniform growth and development of the plant in every direction. By adjusting the screw 42 down or up more or less angularity is given to the pot holder 23. The other lug 41 forms a limiting means for limiting the upward swinging movement of the pot holder, and this lug 41 is adapted to abut against the top of the base 17 at the time the pot holder is in a vertical position as shown in Figs. 1 and 3. In order to lock the pot holder in this vertical position, use is made of a locking pin 50 held on the free end of a spring 51 attached to the outside of the head 18. The pin 50 projects through an opening in one side of the head 18 and is adapted to engage an opening 52 formed in the lug 41, it being understood that the pin 50 snaps into the opening 52 at the time the pot holder is swung into an upright position.

From the foregoing it will be seen that by the arrangement described the pot holder 23 can be readily swung into an angular position and supported therein for the sunlight to properly act on the plant contained in the pot 25. It will also be noticed that as the stand is located adjacent the window the pot holder mounted on the head 18 can be readily turned with the latter so as to hold the plant in the direction of the sunlight. When it is desired to show off the plant to visitors or other persons then the pot holder can be readily swung into vertical position and locked therein, and the pot holder can now be turned around so as to permit of conveniently viewing the plant from all sides without the viewer changing position.

Having thus described my invention, I claim as new and desire to secure by Letters Patent:—

1. A plant stand, comprising a standard provided with a head, a pot holder mounted to swing on the said head to assume an annular position relative to the vertical axis of the said head, adjustable means on the said head engaging the said pot holder for holding the latter in the adjusted angular position and turning means to allow of turning the pot holder relative to the said standard at the time the pot holder is in vertical or in angular position.

2. A plant stand, comprising a head, a pot holder mounted to swing on the said head to assume an angular position relative to the vertical axis of the said head, adjustable means on the said head engaging the said pot holder for holding the latter in the adjusted angular position, and limiting means on the said pot holder engaging the said head for limiting the upward swinging movement of the said pot holder at the time the latter reaches a vertical position, the said adjustable means being adapted to lock the pot holder in this vertical position.

3. A plant stand, comprising a standard, a head mounted to turn on the said standard, a pot holder having a base provided with adjustable means to accommodate pots of different sizes, the base having a depending flange pivoted on the said head, the flange being provided with spaced lugs, of which one is adapted to abut against the bottom of the said head, and a set screw screwing in the said head and adapted to be engaged by the other lug.

4. A plant stand, comprising a standard, a head mounted to turn on the said standard, a pot holder having a base provided with adjustable arms to accommodate pots of different sizes, the base having a depending flange pivoted on the said head, the flange being provided with spaced lugs of which one is adapted to abut against the bottom of the said head, a set screw screwing in the said head and adapted to be engaged by the other lug, and a locking pin engaging the said head and the said first-named lug to lock the pot holder in vertical position.

DORR F. LOUDON.